(12) United States Patent
Junio (10) Patent No.: US 12,458,314 B2
(45) Date of Patent: Nov. 4, 2025

(54) SYSTEM AND METHOD FOR IMAGING (71) Applicant: Mazor Robotics Ltd., Caesarea (IL)

(72) Inventor: Dany Junio, Brookline, MA (US)

(73) Assignee: Mazor Robotics Ltd., Caesarea (IL)

( * ) Notice: Subject to any disclaimer, the term of this patent is extended or adjusted under 35 U.S.C. 154(b) by 508 days.

(21) Appl. No.: 17/900,115

(22) Filed: Aug. 31, 2022

(65) Prior Publication Data
US 2024/0065661 A1    Feb. 29, 2024

(51) Int. Cl.
| | |
|---|---|
| *G06T 7/73* | (2017.01) |
| *A61B 6/00* | (2006.01) |
| *A61B 6/50* | (2024.01) |
| *G06T 1/00* | (2006.01) |
| *G06T 7/00* | (2017.01) |

(52) U.S. Cl.
CPC ............ *A61B 6/5294* (2013.01); *A61B 6/505* (2013.01); *A61B 6/5211* (2013.01); *G06T 1/0007* (2013.01); *G06T 7/0012* (2013.01); *G06T 7/73* (2017.01); *G06T 2207/20084* (2013.01); *G06T 2207/30012* (2013.01)

(58) Field of Classification Search
CPC ....... G06F 3/011; A61B 5/0037; A61B 5/055; A61B 5/1114; A61B 5/1128; A61B 5/4887; A61B 5/0035; A61B 5/7485; A61B 5/0064; A61B 6/5294; A61B 6/505; A61B 6/5211; A61B 6/032; A61B 6/0407; A61B 6/08; A61B 6/4441; A61B 6/469; A61B 8/461; A61B 8/5215; A61B 8/5292; G06T 17/205; G06T 2200/04; G06T 2210/41; G06T 1/0007; G06T 7/0012; G06T 7/73; G06T 2207/20084; G06T 2207/30012; G06T 2207/10132; G06T 2207/20081; G06N 20/20; G06V 10/82; G06V 2201/034; G16H 50/20; G16H 15/00; G16H 30/40; G16H 50/70
See application file for complete search history.

(56) References Cited

U.S. PATENT DOCUMENTS

| | | |
|---|---|---|
| 5,592,939 A | 1/1997 | Martinelli |
| 5,913,820 A | 6/1999 | Bladen et al. |
| 5,983,126 A | 11/1999 | Wittkampf |
| 6,474,341 B1 | 11/2002 | Hunter et al. |
| 6,747,539 B1 | 6/2004 | Martinelli |
| 6,940,941 B2 | 9/2005 | Gregerson et al. |
| 7,001,045 B2 | 2/2006 | Gregerson et al. |
| 7,106,825 B2 | 9/2006 | Gregerson et al. |
| 7,108,421 B2 | 9/2006 | Gregerson et al. |
| 7,188,998 B2 | 3/2007 | Gregerson et al. |
| 7,751,865 B2 | 7/2010 | Jascob et al. |
| 7,797,032 B2 | 9/2010 | Martinelli et al. |
| 9,737,235 B2 | 8/2017 | Hartmann |

(Continued)

OTHER PUBLICATIONS

U.S. Appl. No. 17/900,157, filed Aug. 31, 2022, Dany Junio.

(Continued)

*Primary Examiner* — Cindy Trandai
(74) *Attorney, Agent, or Firm* — Sheridan Ross P.C.

(57) ABSTRACT

An imaging system and method of acquiring image data is disclosed. The imaging system is operable to acquire and/or generate image data at positions relative to a subject. The imaging system includes a drive system configured to move the imaging system.

20 Claims, 7 Drawing Sheets

(56) References Cited

U.S. PATENT DOCUMENTS

| | | | |
|---|---|---|---|
| 11,341,379 B1* | 5/2022 | Bagheri | G06V 10/10 |
| 11,344,268 B2 | 5/2022 | Garlow et al. | |
| 11,399,784 B2 | 8/2022 | Garlow et al. | |
| 2004/0116803 A1 | 6/2004 | Jascob et al. | |
| 2004/0199072 A1 | 10/2004 | Sprouse et al. | |
| 2010/0228117 A1 | 9/2010 | Hartmann | |
| 2012/0099768 A1 | 4/2012 | Helm et al. | |
| 2012/0172700 A1* | 7/2012 | Krishnan | A61B 6/505 |
| | | | 600/407 |
| 2013/0218024 A1 | 8/2013 | Boctor et al. | |
| 2014/0107473 A1 | 4/2014 | Dumoulin et al. | |
| 2016/0073975 A1 | 3/2016 | Hefetz et al. | |
| 2016/0270748 A1 | 9/2016 | Garlow | |
| 2016/0300026 A1* | 10/2016 | Bogoni | G16H 30/40 |
| 2018/0260951 A1* | 9/2018 | Yang | G06N 3/084 |
| 2019/0282183 A1 | 9/2019 | Armand et al. | |
| 2020/0121267 A1 | 4/2020 | Deutschmann | |
| 2020/0311456 A1 | 10/2020 | Ji et al. | |
| 2021/0012135 A1* | 1/2021 | Cao | A61B 6/0407 |
| 2021/0157805 A1* | 5/2021 | Witt | G06F 16/248 |
| 2022/0031263 A1 | 2/2022 | Bertram et al. | |
| 2022/0215201 A1* | 7/2022 | Dwivedi | G06N 3/045 |
| 2022/0318995 A1* | 10/2022 | Chen | G16H 50/20 |
| 2024/0071025 A1* | 2/2024 | Junio | G06T 7/70 |

OTHER PUBLICATIONS

International Search Report and Written Opinion for the related International Application No. PCT/IL2023/050907; date of mailing: Nov. 9, 2023; 11 pages.

International Search Report and Written Opinion for related International Application No. PCT/IL2023/050906; date of mailing: Nov. 8, 2023; 10 pages.

* cited by examiner

SYSTEM AND METHOD FOR IMAGING

CROSS-REFERENCE TO RELATED APPLICATIONS

This application includes subject matter similar to that disclosed in U.S. patent application Ser. No. 17/900,157, filed Aug. 31, 2022 filed concurrently herewith. The entire disclosure of the above application is incorporated herein by reference.

FIELD

The subject disclosure is related to an imaging system, and particularly a mobile imaging system to image portions of a subject.

BACKGROUND

This section provides background information related to the present disclosure which is not necessarily prior art.

Imaging systems generally include integrated patient supports that are used during an imaging procedure. Generally known imaging systems include the BodyTom® CT Imaging System sold by Neurologica Corp. and the Airo® CT Imaging System sold by Brain Lab. These imaging systems include patient supports that are custom designed to hold the patient and provide a track for rigid movement of the imaging system relative to patient support. Imaging systems may further include bases that are fixed in place and include a gantry that is able to move a short distance, such as about 12 centimeters to about 18 centimeters relative to the base during imaging.

SUMMARY

This section provides a general summary of the disclosure, and is not a comprehensive disclosure of its full scope or all of its features.

A system for acquiring image data of a subject, also referred to as an imaging system, is disclosed. The imaging system may acquire image data that is used to generate images of various types. The image data may include two-dimensional projections. The generated images (also referred to herein as image) may include reconstructed three-dimensional images, two-dimensional images, or other appropriate image types. In various embodiments, the imaging system may be an X-ray scanner or a CT scanner. The image data may be two-dimensional (e.g., projection image data) or other appropriate types of image data.

The imaging system may further include a mobility feature that allows it to move relative to a subject. In various embodiments, the subject may be positioned on a support, such as a standard and/or generally known radiolucent surgical table such as the STERIS 4085 SURGICAL TABLE sold by Steris plc, having a place of business in Ohio, that may be located in selected medical facilities. The imaging system is configured to be positioned relative to the subject to acquire image data of the subject in a selected manner to allow reconstruction of images for display of selected images.

In various embodiments, image data may be acquired while the imaging system is moving relative to the subject. For example, the imaging system may rotate in all or a portion of 360 degrees relative to (e.g., around) the subject. The imaging system may, also or in addition to rotation, move along a longitudinal axis of the subject. In moving along the longitudinal axis of the subject and/or transverse to the longitudinal axis, the imaging system may be driven by a drive system that may include selected wheel supports. The wheel supports may include omni-directional wheels, such as mecanum or omni-wheels. The omni-directional wheels generally include at least a first rolling portion and a second roller or rolling portion. The imaging system may move substantially in one or both of an X-axis and a Y-axis direction. Further, the imaging system may tilt relative to the subject to acquire image data at an angle relative to the longitudinal axis of the subject.

The imaging system may be moved by a manual manipulation of the imaging system. In various embodiments, the imaging system may include a handle that includes one or more sensors that sense a force, such as pressure, from the user to directly move the imaging system relative to the subject. The manual movement of the imaging system may be inclusive or exclusive of other drive or robotic control features of the imaging system. Accordingly, the user may selectively move the imaging system relative to the subject in an efficient and quick manner without pre-planning a movement of the system.

The imaging system may further include controls, such as automatic or robotic controls, that move the imaging system relative to the subject. The imaging system may move with or according to a planned path relative to the subject for acquiring a selected image data collection of the subject. For example, reconstruction of a selected three-dimensional model of a selected portion of the subject may be selected, and the imaging system may be programmed to determine, such as in real time, movements for acquiring appropriate image data and then automatically moving relative to the subject to acquire appropriate amount and type of image data for the three-dimensional reconstruction. For example, the image system and/or a related processor may determine a current imaging position and determine a different imaging position to acquire image data to generate a selected image. The imaging system may then automatically and/or direct motion of the imaging system to acquire additional image data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
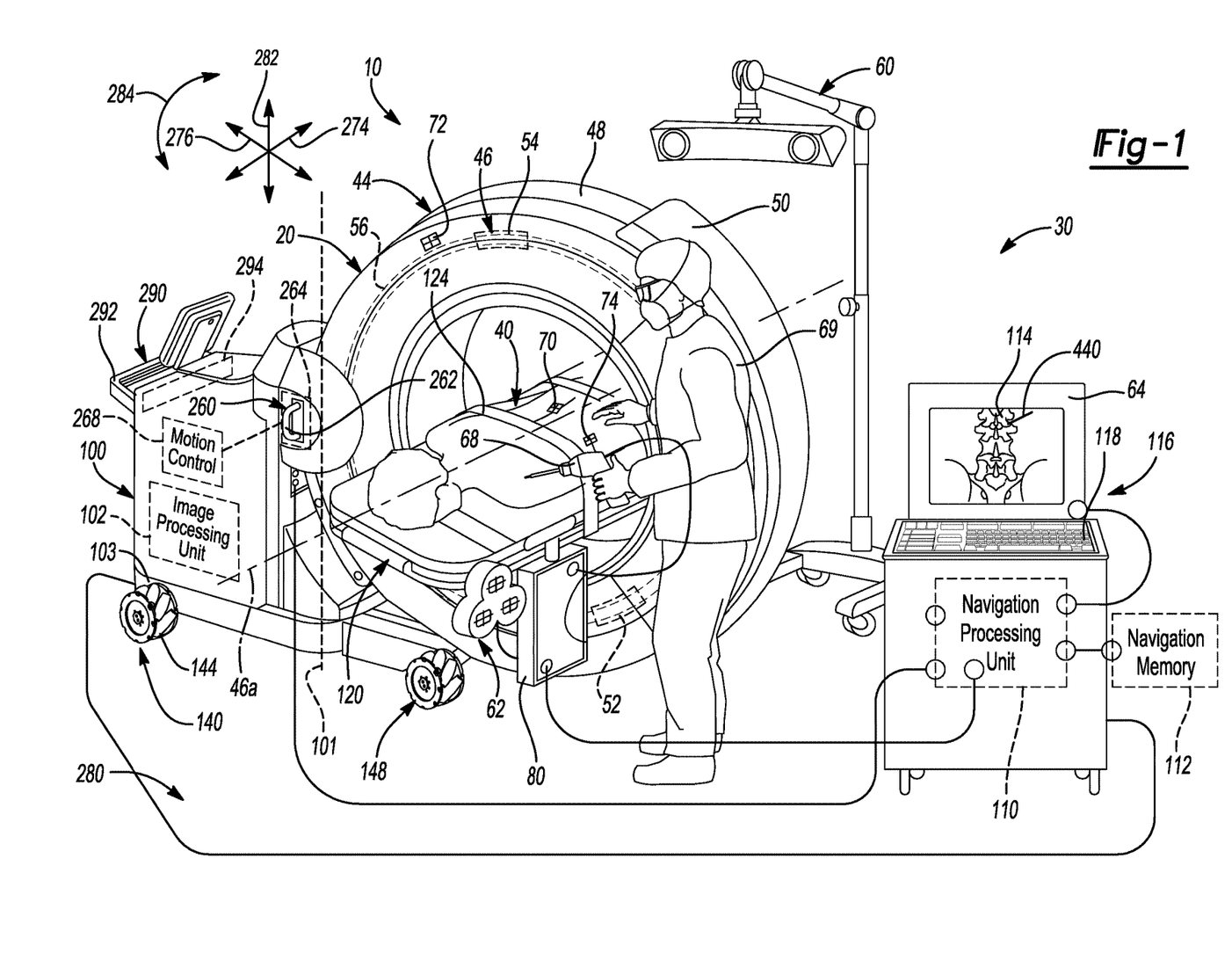
FIG. 1 is an environmental view of an imaging system.

FIG. 1 is a diagram illustrating an overview of an operating theater system 10 that may include an imaging system 20 and a navigation system 30, which can be used for various procedures. The navigation system 30 can be used to track a pose of an item, such as an implant or an instrument, relative to a subject, such as a patient 40. The pose may include a physical location (e.g., x, y, and z axis location) and orientation (e.g., yaw, pitch, and roll orientation). It should further be noted that the navigation system 30 may be used to navigate any type of instrument, implant, or delivery system, including: guide wires, arthroscopic systems, orthopedic implants, spinal implants, deep brain stimulation (DBS) probes, etc. Moreover, the instruments may be used to navigate or map any region of the body. The navigation system 30 and the various tracked or navigated items may be used in any appropriate procedure, such as one that is generally minimally invasive or an open procedure. The navigation system 30 may further be used to track and determine a pose of the imaging system 20 relative to the patient 40

The imaging system 20 is used to acquire image data of the patient 40. The image data of the patient 40 may be acquired for various purposes such as for planning a procedure and/or confirming a procedure. The image data may be acquired of a specific portion of the patient, such as within a region of interest (ROI).

As discussed further herein, the imaging system 20 may be positioned relative to the patient at a first or initial position. Selected image data may be acquired of the patient 14 at the initial position. Based on the initial image data, a position or identification of a portion of the patient 40 may be made. Based upon the identification of the portion of the patient in the first image acquisition, a determination may be made by executing selected instructions to move the imaging system 20 to a second, subsequent, or other locations for acquiring additional image data of the patient 14 to acquire image data of the ROI. Thus, the imaging system 20 may be moved relative to the patient 40 to generate one or more image data acquisitions to allow for generation of selected images of the ROI of the patient 40. In various embodiments, the ROI may include one or more vertebrae of the patient 40.

The navigation system 30 can interface with the imaging system 20 that is used to acquire pre-operative, intra-operative, or post-operative, or real-time image data of the patient 40. It will be understood, however, that any appropriate subject can be imaged and any appropriate procedure may be performed relative to the subject. In the example herein described, the imaging system 20 comprises or may include portions of an O-arm® imaging system or device sold by Medtronic Navigation, Inc. having a place of business in Louisville, Colorado, USA. In various embodiments, the imaging system 20 may have a gantry housing 44 that encloses an image data capturing portion 46. The gantry 44 may include a first portion 48 (which may include a generally fixed portion) and a second portion 50 (which may include a moveable portion that is moveable relative to the first portion 48). The image capturing portion 46 may include an x-ray source or emission portion 52 and an x-ray receiving or image receiving portion (also referred to as a detector that may be operable to detect x-rays) 54 located generally or as practically possible 180 degrees from each other and mounted on a moveable rotor (not illustrated) relative to a track 56 of the image capturing portion 46. The image capturing portion 46 can be operable to rotate 360 degrees around the gantry 44 on or with the rotor during image data acquisition.

Figure 2:
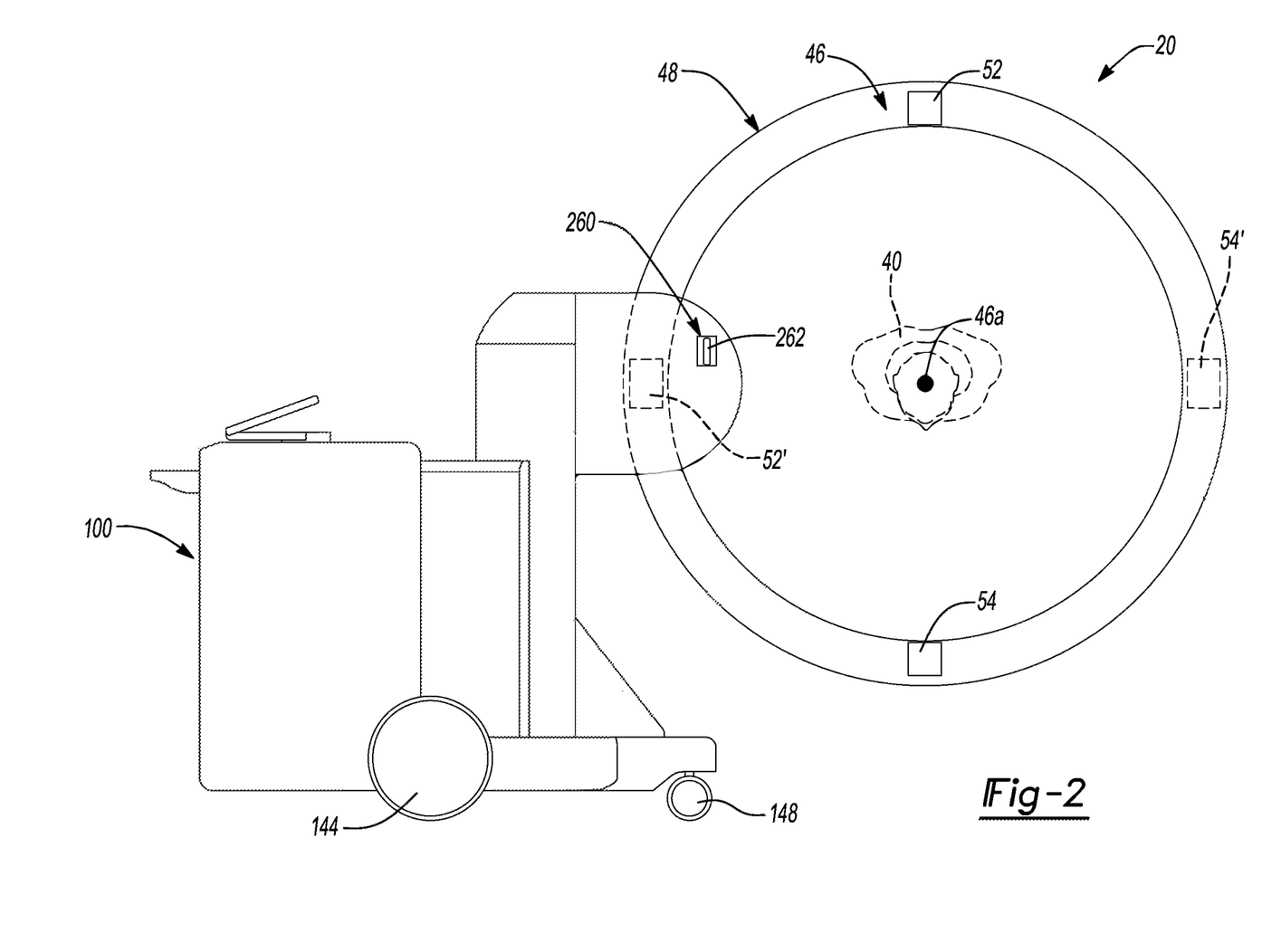
FIG. 2 is a schematic view of selected motion of the imaging system, according to various embodiments.

The image capturing portion 46 may rotate around a central point or axis 46a, allowing image data of the patient 40 to be acquired from multiple directions or in multiple planes, as discussed further herein an as illustrated in FIG. 2. The axis 46a of the imaging system 20 may be aligned or positioned relative to an axis, such as a longitudinal axis, of the patient 40. The imaging system 20 can include all or portions of the systems and methods those disclosed in U.S. Pat. Nos. 7,188,998; 7,108,421; 7,106,825; 7,001,045; and 6,940,941; all of which are incorporated herein by reference. Other possible imaging systems can include C-arm fluoroscopic imaging systems which can also generate three-dimensional views of the patient 40. As discussed herein, the imaging system may move relative to the patient 40 as discussed herein. Exemplary systems that include moveable imaging systems include U.S. Pat. No. 11,344,268 issued May 31, 2022; U.S. Pat. No. 11,399,784 issued Aug. 2, 2022; and U.S. patent application Ser. No. 13/016,718 published on Apr. 26, 2012 as U.S. Pat. App. Pub. No. 2012/0099768, all incorporated herein by reference.

The position of the image capturing portion 46 can be precisely known relative to any other portion of the imaging device 20. The imagining system may include one or more sensors to determine a position of the image capturing portion relative to any other portion of the imaging system 20. In addition to and/or alternatively to the precise knowledge of the position of the image capturing portion 46, the navigation system 30 having a tracking portion (e.g., an optical tracking system including an optical localizer 60 and/or an electromagnetic (EM) tracking system including an EM localizer 62) may be used to determine the position of the image capturing portion 46 and the image data relative to the tracked subject, such as the patient 40.

Various tracking devices, including those discussed further herein, can be tracked with the navigation system 30 and the information can be used to allow for displaying on a display 64 a position of an item, e.g. a tool or instrument 68. The instrument may be operated, controlled, and/or held by a user 69. The user 69 may be one or more of a surgeon, nurse, welder, etc. Briefly, tracking devices, such as a patient tracking device 70, an imaging device tracking device 72, and an instrument tracking device 74, allow selected portions of the operating theater 10 to be tracked relative to one another with the appropriate tracking system, including the optical localizer 60 and/or the EM localizer 62. Generally, tracking occurs within a selected reference frame, such as within a patient reference frame.

It will be understood that any of the tracking devices 70, 72, 74 can be optical or EM tracking devices, or both, depending upon the tracking localizer used to track the respective tracking devices. It is understood that the tracking devices 70-74 may all be similar or different, and may all be interchangeable but selected or assigned selected purposes during a navigated procedure. It will be further understood that any appropriate, such as alternative or in addition thereto, tracking system can be used with the navigation system 30. Alterative tracking systems can include radar tracking systems, acoustic tracking systems, ultrasound tracking systems, and the like.

An exemplarily EM tracking system can include the STEALTHSTATION® AXIEM™ Navigation System, sold by Medtronic Navigation, Inc. having a place of business in Louisville, Colorado. Exemplary tracking systems are also disclosed in U.S. Pat. No. 7,751,865, issued Jul. 6, 2010; U.S. Pat. No. 5,913,820, issued Jun. 22, 1999; and U.S. Pat. No. 5,592,939, issued Jan. 14, 1997, all incorporated herein by reference.

Further, for EM tracking systems it may be necessary to provide shielding or distortion compensation systems to shield or compensate for distortions in the EM field generated by the EM localizer 62. Exemplary shielding systems include those in U.S. Pat. No. 7,797,032, issued Sep. 14, 2010 and U.S. Pat. No. 6,747,539, issued Jun. 8, 2004; distortion compensation systems can include those disclosed in U.S. patent application Ser. No. 10/649,214, filed on Jan. 9, 2004, published as U.S. Pat. App. Pub. No. 2004/0116803, all of which are incorporated herein by reference.

With an EM tracking system, the localizer 62 and the various tracking devices can communicate through an EM controller 80. The EM controller can include various amplifiers, filters, electrical isolation, and other systems. The EM controller 80 can also control the coils of the localizer 62 to either emit or receive an EM field for tracking. A wireless communications channel, however, such as that disclosed in U.S. Pat. No. 6,474,341, issued Nov. 5, 2002, herein incorporated by reference, can be used as opposed to being coupled directly to the EM controller 80.

It will be understood that the tracking system may also be or include any appropriate tracking system, including a STEALTHSTATION® TRIA®, TREON®, and/or S7™ Navigation System having an optical localizer, similar to the optical localizer 60, sold by Medtronic Navigation, Inc. having a place of business in Louisville, Colorado. Further alternative tracking systems are disclosed in U.S. Pat. No. 5,983,126, issued Nov. 9, 1999, which is hereby incorporated by reference. Other tracking systems include an acoustic, radiation, radar, etc. tracking or navigation systems.

Briefly, to be discussed in further detail herein, the imaging system 20 can include a support system including a housing or cart 100. The imaging system 20 can further include a separate image processor 102, also referred to as a processing unit, which may be housed in the cart 100. The navigation system 30 can include a navigation processor 110, also referred to as a navigation processing unit that can communicate or include a navigation memory 112. The navigation processing unit 110 can receive information, including image data, from the imaging system 20 and tracking information from the tracking system, including the respective tracking devices 70, 72, and 74 and the localizers 60, 62. Image data can be displayed as an image 114 on the display device 64 of a workstation or other computer system 116. The workstation 116 can include appropriate input devices, such as a keyboard 118. It will be understood that other appropriate input devices can be included, such as a mouse, a foot pedal or the like.

The image processing unit 102 may be configured, if provided, to process image data from the imaging system 20 and transmit the image data to the navigation processor 110. The image processing unit 102 may also execute selected instructions, as discussed herein, to determine movements and/or move the imaging system 20 relative to the subject 40. The movement may be automatic and/or determined and instructions are provided for movement of the imaging system 20. It will be further understood, however, that the imaging system 20 need not perform any image processing and/or movement determination and the image processing unit 102 can transmit the image data directly to the navigation processing unit 110. In various embodiments, the navigation system 30 may include or operate with a single or multiple processing centers or units that can access single or multiple memory systems based upon system design. It is understood, however, that all of the processing units discussed herein may be generally processors that are executing instructions recalled from a selected memory, have onboard memory, or be application specific processors. Further, each of the processors may be provided or configured to perform all processing tasks discussed herein. Thus, although a specific process may be discussed as an imaging process, the navigation processing unit 110 may also be configured to perform the process.

The imaging system 20, as discussed herein, may move relative to the patient 40. The patient 40 may be fixed to an operating table or support table 120, but is not required to be fixed to the table 120. The table 120 can include a plurality of straps 124. The straps 124 can be secured around the patient 40 to fix the patient 40 relative to the table 120. Various additional or alternative apparatuses may be used to position the patient 40 in a static position on the operating table 120. Examples of such patient positioning devices are set forth in U.S. Pat. App. Pub. No. 2004/0199072, published Oct. 7, 2004, (U.S. patent application Ser. No. 10/405,068 entitled "An Integrated Electromagnetic Navigation And Patient Positioning Device", filed Apr. 1, 2003), which is hereby incorporated by reference. Other known apparatuses may include a Mayfield® clamp.

Also, the position of the patient 40 relative to the imaging system 20 can be determined by the navigation system 30 with the patient tracking device 70 and the imaging system tracking device 72. Accordingly, the position of the patient 40 relative to the imaging system 20 can be determined. An exemplary imaging system, such as the O-arm®, may also be operated to know a first position and can be repositioned to the same first position within a selected tolerance. The tolerance may be about 0.01 millimeters (mm) to about 10 mm, about 0.01 mm to about 2 mm, and about 10 microns. This allows for a substantially precise placement of the imaging system 20 and precise determination of the position of the imaging device 20. Precise positioning of the imaging portion 22 is further described in U.S. Pat. Nos. 7,188,998; 7,108,421; 7,106,825; 7,001,045; and 6,940,941; all of which are incorporated herein by reference.

Physical space of and/or relative to the subject, such as the patient 40, may be referred to as subject or patient space. Image space of an image or coordinate system of an image that is generated or reconstructed with the image data from the imaging system 30 may be referred to as image space. The image space can be registered to the patient space by identifying matching points or fiducial points in the patient space and related or identical points in the image space. The imaging device 20 can be used to generate image data at a precise and known position. This can allow image data that is automatically or "inherently registered" to the patient 40 upon acquisition of the image data. Essentially, the position of the patient 40 is known precisely relative to the imaging system 20 due to the accurate positioning of the imaging system 20 in the patient space. This allows points in the image data to be known relative to points of the patient 40 because of the known precise location of the imaging system 20.

Alternatively, manual or automatic registration can occur by matching fiducial points in image data with fiducial points on the patient 40. Registration of image space to patient space allows for the generation of a translation map between the patient space and the image space. According to various embodiments, registration can occur by determining points that are substantially identical in the image space and the patient space. The identical points can include anatomical fiducial points or implanted fiducial points. Exemplary registration techniques are disclosed in U.S. Pat. No. 9,737,235, issued Aug. 22, 2017, incorporated herein by reference.

Once registered, the navigation system 30, with and/or including the imaging system 20, can be used to perform selected procedures. Selected procedures can use the image data generated or acquired with the imaging system 20. Further, the imaging system 20 can be used to acquire image data at different times relative to a procedure. As discussed herein, image data can be acquired of the patient 40 subsequent to a selected portion of a procedure for various purposes, including confirmation of the portion of the procedure.

Figure 3:
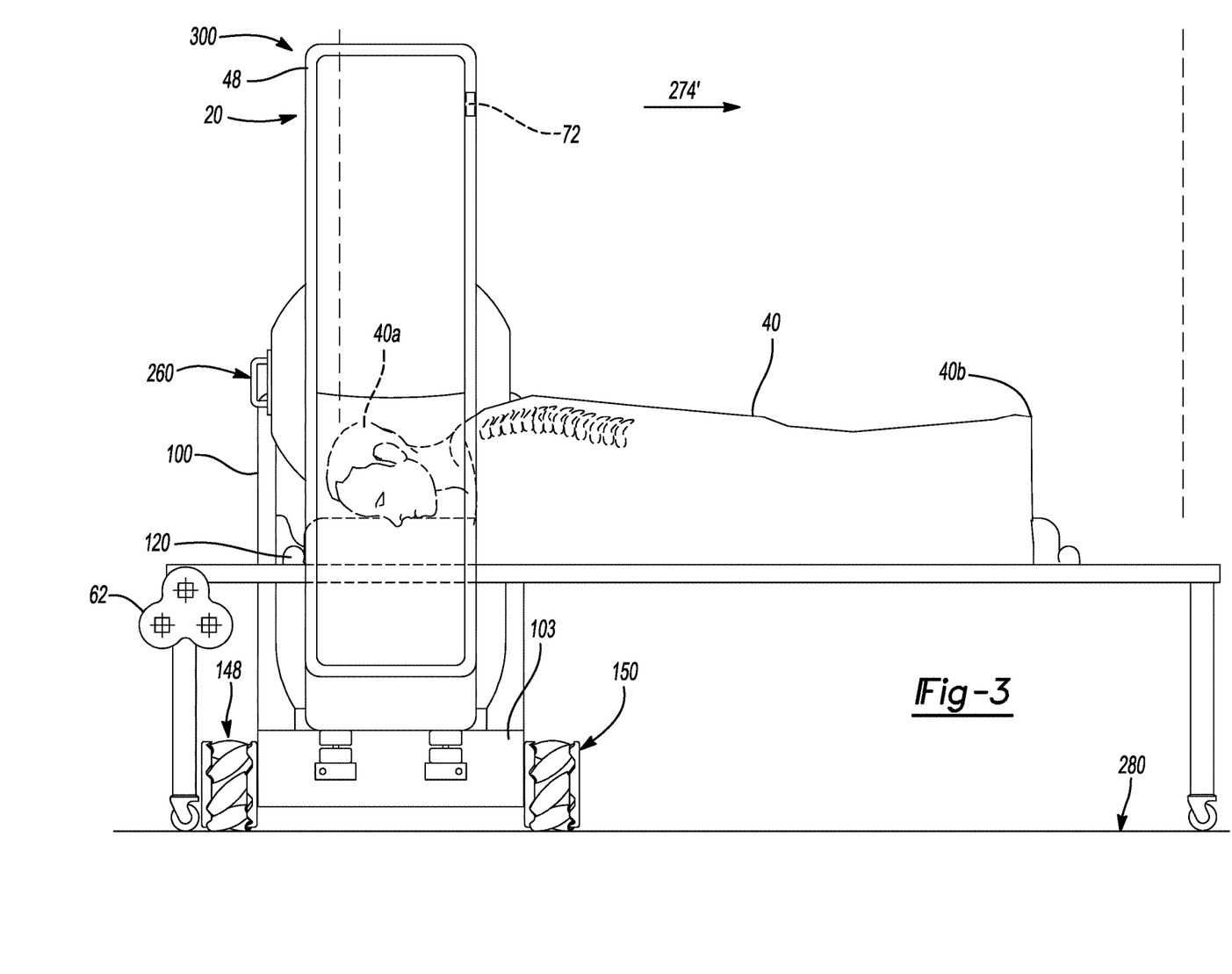
FIG. 3 is a schematic view of the imaging system in a first position.
Figure 4:
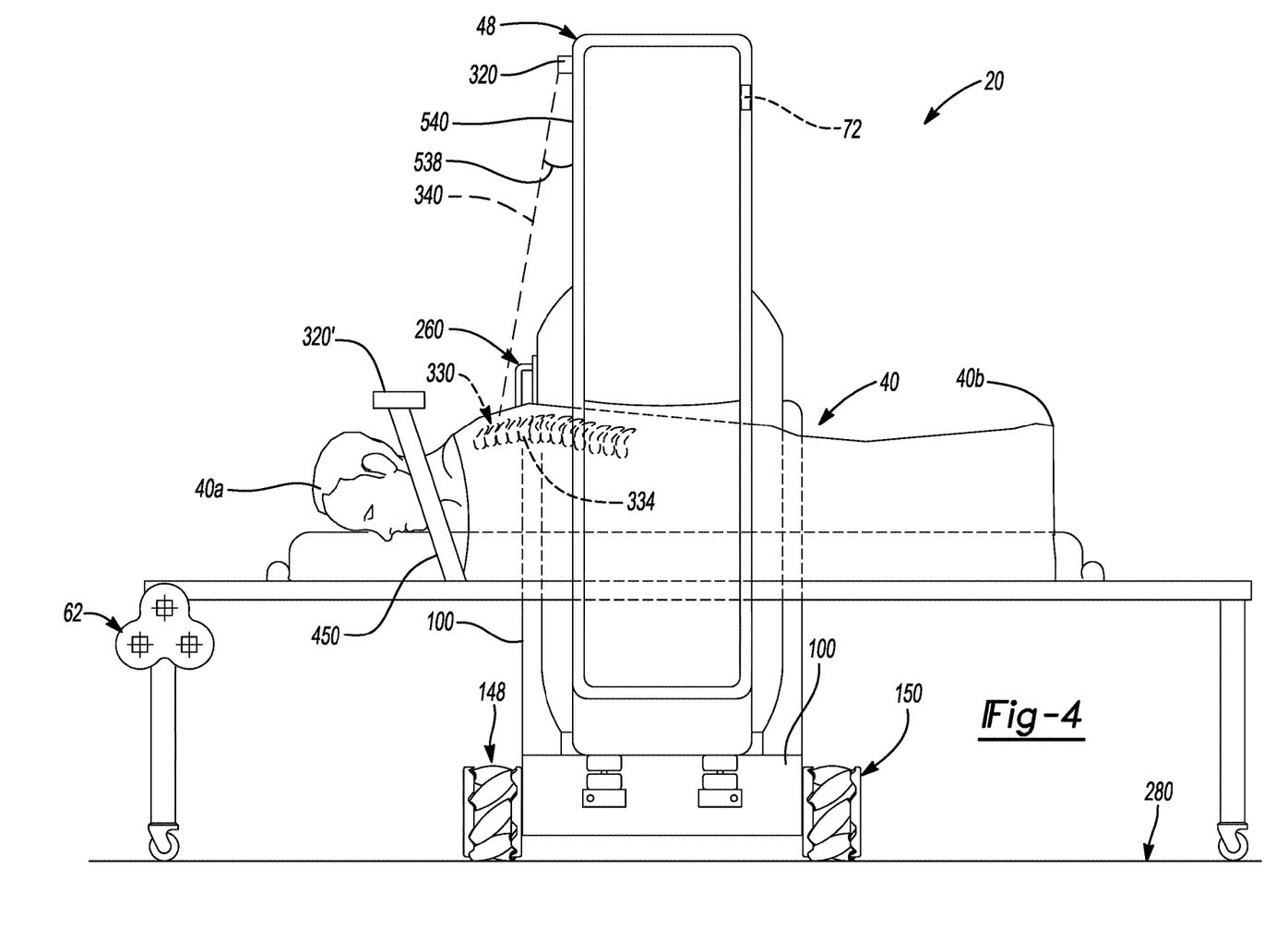
FIG. 4 is a schematic view of the imaging system in a second position.

With continuing reference to FIG. 1 and additional reference to FIG. 2, FIG. 3, and FIG. 4, the imaging system 20 may be configured to acquire image data that is used to generate actual or virtual two- or three-dimensional (2D or 3D) images of the patient 40. As discussed above, the imaging system processor 102 and/or the navigation system processing unit 110 may be used to generate or reconstruct images for display and/or viewing by a user 69. The image data is acquired with the patient 40 placed relative to the imaging system 20 to allow the imaging system 20 to obtain image data of the patient 40. While acquiring the image data, the imaging system 20 may move relative to the patient 40.

In various embodiments, to generate a 3D image for display with the display device 64, image data can be acquired from a plurality of views or positions relative to the patient 40. The acquired image data may include a plurality of projections through the patient 40, such as those generated with x-rays, and may include 2D projections. The plurality of projections, or other appropriate image data, of the patient 40 can be used alone or with other information to generate or reconstruct an image to assist in performing a procedure on the patient 40. It is understood, however, that the patient 40 need not be the subject and other appropriate subjects may be imaged. It will also be understood that any appropriate imaging system can be used, including a magnetic resonance imaging (MRI) system, computed tomography (CT) imaging system, fluoroscopy imaging system, X-ray imaging system, etc.

To acquire the plurality of image data, including the plurality of projections of the patient, the imaging system 20 is moved. In various embodiments, the imaging system 20 includes a drive system 140 to move and/or assist in movement of the imaging system 20. The drive system 140, as discussed herein, may be a multi-directional drive system, in various embodiments the drive system may be an omni-directional drive system and may include a plurality of omni-directional wheels, such as mecanum wheels 144, 148. A multi-directional and/or omni-directional drive system may be configured to move a construct, such as the imaging system 20, in at least two directions separately and/or simultaneously. When moving, for example, the imaging system 20 may be driven by the multi-directional drive system 140 at an angle relative to two perpendicular axes. The multi-directional drive system 140 may be operated to rotate the imaging system 20 around an axis 101 defined within the imaging system 20. Moreover, the multi-directional drive system 140 may be operable to drive the imaging system 20 in a plurality of axes while acquiring image data of the subject 40. Further, in various embodiments, the drive system 140 may be operated to move the imaging system in at least two axes of motion simultaneously or separately. It is understood, however, the drive system may move the imaging system 20 in more or less than two axes simultaneously.

The drive system 140 includes wheels or rollers, including at least one (e.g., a first) omni-directional wheel 144. The omni-directional wheel 144, which may include rollers, may translate in a plane and rotate around an axis perpendicular to the plane. During translation, the omni-directional wheel 144 may generally move in any direction from a starting point. Further, the translation and rotation of the omni-directional wheel may be substantially precise and controlled. It is understood that the drive assembly 140 may include more than the omni-directional wheel 144 and may include at least one or more omni-directional wheels, such as a total of four wheels. Each of the multiple wheels may be positioned at selected locations relative to one another to be driven to achieve a selected movement of the imaging system 20.

Each of the omni-directional wheels may be substantially similar, however, and include similar or identical portions. The wheels, therefore, may include a second omni-directional wheel 146, a third omni-directional wheel 148 and a fourth omni-directional wheel 150. The omni-directional wheels 144, 146, 148, 150 may be any appropriate omni-directional wheels such as the heavy duty Mecanum Wheel (Item number NM254 AL. manufactured by Omni Mechanical Technology, No. 3 Yaxin Alley, Xiao Bian ST, Chang'an Town, Dongguan City, Guang Dong Province, China) and/or Rotacaster® omnidirectional wheels sold by Rotacaster Wheel Limited having a place of business in Tighes Hill, Australia. As discussed herein, the driving of the wheels 144-150 may be used to achieve a selected image data acquisition of the patient 40. Exemplary systems that include moveable imaging systems with one or more omni-directional wheels include U.S. Pat. No. 11,344,268 issued May 31, 2022 and U.S. Pat. No. 11,399,784 issued Aug. 2, 2022, both incorporated herein by reference.

The gantry 48 may move alone selected axes, such as relative to the cart 100. For example, the gantry may move along the generally orthogonal axes 274, 276, and 282. The axis 274 may be generally aligned with a long axis 46a of the patient 40. The axis 282 may generally be perpendicular to a surface 280 on which the cart 100 rests. Further, the gantry may wag or pivot about the axis 101, 282 such as generally in the direction of the double headed arrow 284. The gantry 48 may be moveable relative to eh cart 100 in any appropriate manner and may be controlled, as discussed herein.

The imaging system 20 may be positioned by the user 69, or other appropriate individual. In various embodiments, a handle or manipulation assembly 260 is connected with at least a portion, such as a housing or the mobile cart 100 to move the imaging system 20. The user 69 may engage the handle assembly 260 that includes a grasping portion 262 and a sensing portion 264. The handle portion 262 may be connected with one or more sensors in the sensing portion 264 to sense a force, such as an amount of force and a direction of force applied to the handle 262. Other appropriate sensors may be included, such as a flexure, pressure sensor, or the like. In addition, other controls may be provided at the handle assembly 260. The handle assembly 260 may include portions similar to those included in the O-arm® imaging system sold by Medtronic, Inc. and/or those disclosed in U.S. Pat. App. Pub. No. 2016/0270748, published Sep. 22, 2016, incorporated herein by reference.

In various embodiments, the handle 262 having a force applied thereto by the user 69 and the sensing unit 264 sensing the force applied by the user 69 to the handle 262 may then move the imaging system 20. The sensors in the sensing unit 264 may be any appropriate sensor, such as force sensors (e.g. resistance sensors, voltage sensors, load sensors, position sensors, velocity sensors or the like), direction sensors (e.g. gyroscopes), or other appropriate sensors. The sensors in the sensing unit 264 may send a sense signal to a controller, such as included with the image processing unit 102 and/or a separate motion controller 268 that may also include one or more processors. The motion control 268 may receive the sensed signals from the sensors 264 regarding the force applied by the user 69 on the handle 262. The motion controller 268 may then generate a drive signal to drive one or more of the motors associated with one or more of the respective wheels 144-150. The motion controller 268 may be any appropriate motion controller, such as multi-axis motion controllers including Ethernet or computer card (PCI) controllers including the DMC-18x6 motion controller sold by Galil Motion Control, having a place of business in Rockland, California.

The motion controller 268, however, may be any appropriate motion controller, and may control the operation of the motors to drive the respective wheels 144-150. By controlling the respective motors, the respective omni-directional wheels 144-150 may be rotated around the respective axles in an appropriate manner. By driving the omni-directional wheels 144-150 around the respective axles in a selected manner the imaging system 20 may be moved in or along selected and/or appropriate axes.

It is further understood that handle assemblies may be positioned at other locations on the imaging system 20. For example, a second handle assembly 290 may be positioned away from the handle assembly 260. The second handle assembly 290 may also include a handle 292 and a sensor assembly 294. The sensor assembly 294 may be similar to the sensor assembly 264 and be in communication with the motion control 268. The handle assembly 290 may move the imaging system 20 in all of the directions or along the axes 274, 276, 282, and 284, as discussed above or a limited number thereof. For example, the second handle assembly 290 may be used to move the imaging system 20 from a first gross location (e.g. a storage locker) to a second gross location (e.g. an operating room). Therefore, the second handle assembly 290 may be limited in movement of the imaging system 20 generally along the axes 274, 276 and in the direction of arrow 284.

Moreover imaging of the patient 40 may be done substantially automatically, manually, or a combination of both. With continuing reference to FIGS. 1-4, the imaging system 20 is movable relative to the patient 40. Movement of the imaging system may include movement of the image capture portions 46, the gantry 48, the cart 100, or any selected combination. Thus, the imaging system 20 may move relative to the patient 40 in an appropriate manner, as discussed herein.

Driving the omni-directional wheels at different speeds and/or directions may cause different total movement of the imaging system 20. Accordingly, the imaging system 20, including the cart 100 and the gantry 48 together, may be moved in the first axis 274. The first axis 274 may be an axis that is generally along a long axis 46a of the subject, such as the patient 40. Additionally, the motion controller 268 may operate the motors to move the imaging assembly 20 in the second axis 276, which may be substantially perpendicular to the first axis 274. The two axes 274, 276 may allow movement of the imaging system 20 generally in a plane.

The movement plane defined by the axes 274, 276 may be substantially parallel or defined by the surface 280 on which the imaging system 20 is placed. Further the imaging system 20 may rotate around the axis 282, which may be substantially perpendicular to the first axis 274 and the second axis 276. Generally, the imaging system 20 may rotate in the direction of arrow 284 around the axis 282. Further the imaging system 20 including the gantry 48 may move in the direction of the axis 282 which is substantially perpendicular to the axes 274, 276. Further, the gantry 48 may move in the direction of axis 282 and this movement may not be movement due to the drive assembly 140, although the motion controller 268 may be used to move the gantry 48 also in the direction of the axis 282.

In addition to movements of the cart 100 and/or the gantry 48, the imaging portion 46 of the imaging system 20 may also move relative to the patient 40, such as relative to the long axis 46a. For example, as illustrated in FIG. 2, the source 52 may rotate around the axis 46a. The detector 54 may also rotate around the axis 46a. Thus, the source and detector 52, 54 may be at a first position and may move to a second position as illustrated in phantom 52', 54'. Thus of the imaging portion 46 may also rotate within the gantry 48 of rounded the axis 46a. It is understood that the imaging portion 46 may move to substantially an infinite number of positions around the axis 46a. The rotation of the imaging portion 46 may be in addition to and/or alternative to movement of the gantry 48 alone, the cart 100 alone, or combinations of the gantry 48 and the cart 100. Thus, of the imaging collection portion 46 may move separately and/or in concert with the cart 100 and gantry 48.

As illustrated in FIGS. 3 and 4 patient 40 is positioned on the support 120, such as a hospital bed or operating room (e.g., radiolucent) bed. It is understood that patient 40 may be positioned at any appropriate location or room. Nevertheless, the imaging system 20 may move relative to the patient 40 to acquire image data for generation of the image 114 to be displayed on the display device 64, or any other appropriate display device.

As illustrated in FIG. 3, the imaging system 20 may be positioned at an initial or starting position or location 300 relative to the patient 40. During operation and movement of the imaging system 20, the patient 40 need not move, according to various embodiments. The imaging system 20 may be moved relative to the subject in any appropriate manner or direction, or combination of direction to movements including those discussed above. For example, the imaging system 20 may move along axis 274 in the direction of arrow 274', as illustrated in FIG. 3. Accordingly, the imaging system 20 may move from near a head 40a of the patient 40 towards a foot 40b of the patient 40, as illustrated in FIG. 4.

During movement of the imaging system 20 the gantry 48 may move in the direction of arrow 274' and/or the entire imaging system assembly may move in the direction of arrow 274'. During movement of the entire imaging system 20, including the gantry 48 and the cart 100, the motion controller 268 may operate the drive assembly 140, including the omni-directional wheels 148, 150 to move the imaging system 20 generally in the direction of arrow 274'. The imaging system 20 may include various portions, such as those discussed above, which may also rotate around a patient 40, such as around a long axis 46a of the patient 40.

With continuing reference to FIG. 4, the imaging system 20 may also have associated there with an indicator 320. The indicator 320 may be used to indicate a selected portion of the patient 40 such as one or more of a vertebrae of a spine 330. As discussed further herein, a procedure may be performed on the patient 40, such as relative to one or more of the vertebrae in the spine 330. The procedure may be an appropriate procedure, such as a fusion, disc replacement, or the like. The indicator 320 may be used to indicate a selected portion, such as a portion of the spine 330. The selected portion may be the ROI which may be an appropriate region of interest for a procedure, such as on a specific vertebra including vertebra T12 334 (the 12th thoracic vertebra). The specific vertebra, such as T12 334, may be indicated with the indicator 320.

The indicator 320 may be any appropriate indicator. For example, is illustrated in FIG. 4, the indicator 320 may be a laser emitter. The laser emitter may emit a visible laser light as a beam 340. The beam 340 may be directed toward the specific vertebrae 334. The indicator 320 may be movable such as with appropriate movement systems including mechanical, electromechanical, electrical, or the like. A movable laser may include a visible laser emitter that is moved with a robotic system based upon instructions. For example, the laser emitter may be placed on a gimbal that is moved with actuators to move the laser emitter to direct the laser beam.

The indicator 320 may also be a mechanical indicator, such as a physical or mechanical pointer, a visible light that may include a selected shape such as an "arrow", or other appropriate indicator. Regardless the indicator 320 that is associated with imaging system 20 and may be directed to indicate the ROI of the patient 40 that may be imaged and/or after imaging the ROI of the patient 40. Methods and characteristics of the indication are discussed further herein.

As discussed above, the imaging system 20 may move relative to the patient 40 to acquire image data of the patient 40. The image data of the patient 40 may then be used to generate one or more images that are displayed on the display device 64 as of the image 114. The image 114, however, may be generated based upon a plurality of image data or generated at a plurality of times. With continuing reference to FIG. 3 and additional reference to FIGS. 5 and 6, the display 64 may display selected image data at different times. For example, a first image 114a may be displayed based upon image data that is acquired of the patient 40 at the initial position or pose of the imaging system 20. At a second or subsequent time, image data 114b may be displayed on the display device 64 based upon a second or subsequent image data generated with the imaging system 20 at a second or subsequent time. The difference between the two images 114a and 114b may be based upon the two different positions (e.g., initial and subsequent pose) of the imaging system 20 relative to the subject 40. In addition, as discussed above, image data may be acquired at different perspectives relative to the a patient 40. For example, in anterior-to-posterior and a medial-to-lateral image data may be generated to generate at least two different perspectives of the patient 40. Therefore, the images 114a, 114b may include both views. Regardless the images 114a and 114b may both be images that are generated for display on the display device 64. The images 114 may be generated based upon instructions executed by selected processors, such as the imaging processor 102 or the navigation processing unit 110. Selected known algorithms may be used to generate the images based upon the acquired image data.

Figure 5:
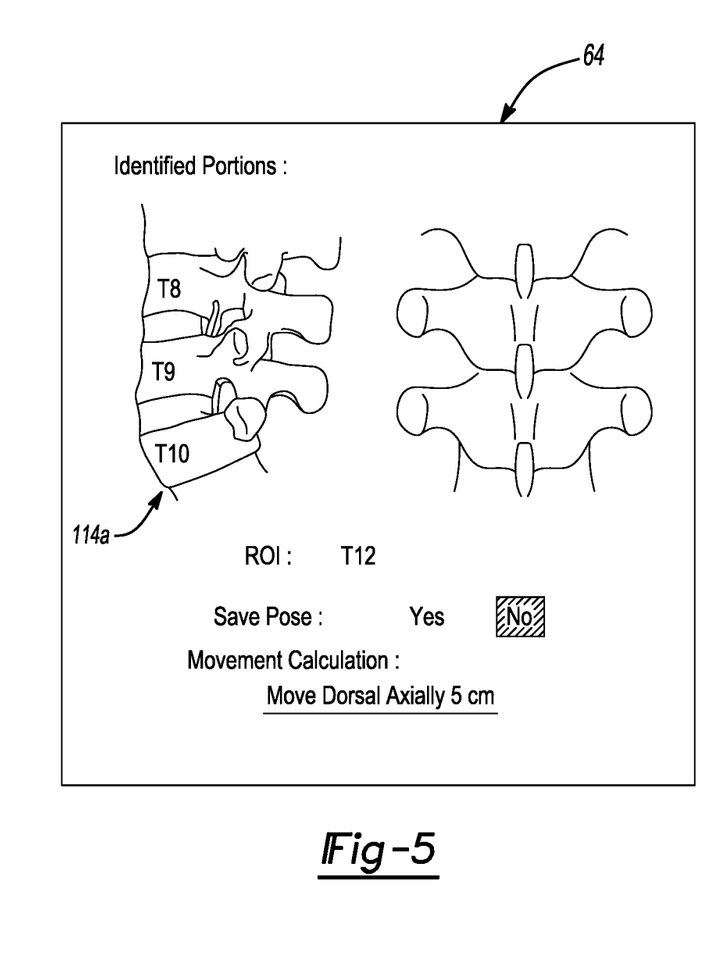
FIG. 5 is a screen shots of an image generated with image data at a first position.
Figure 6:
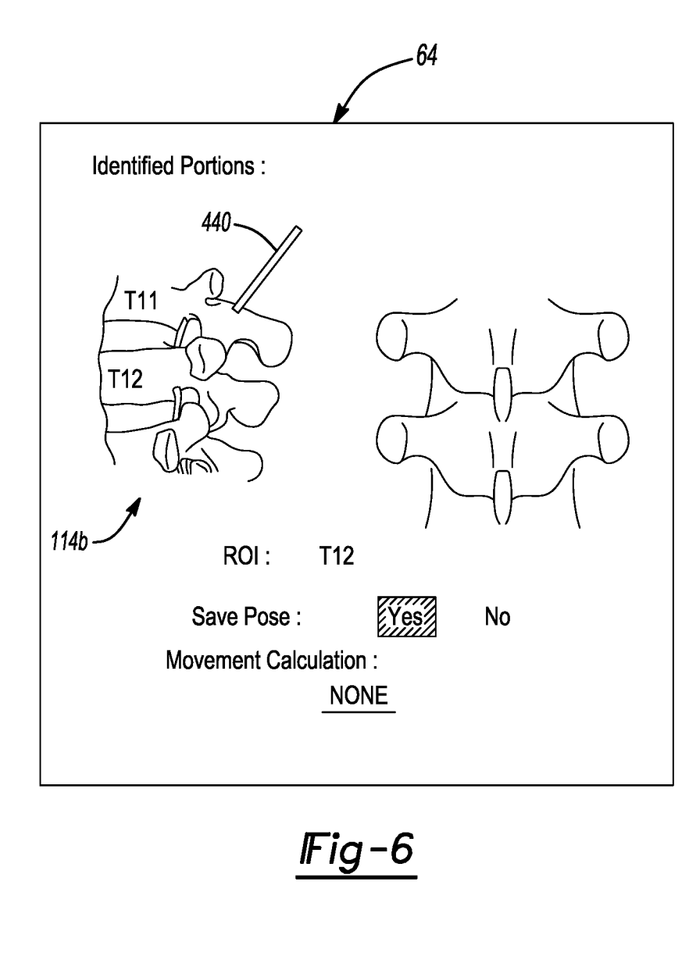
FIG. 6 is a screen shot of an image generated with image data at a subsequent position.
Figure 7:
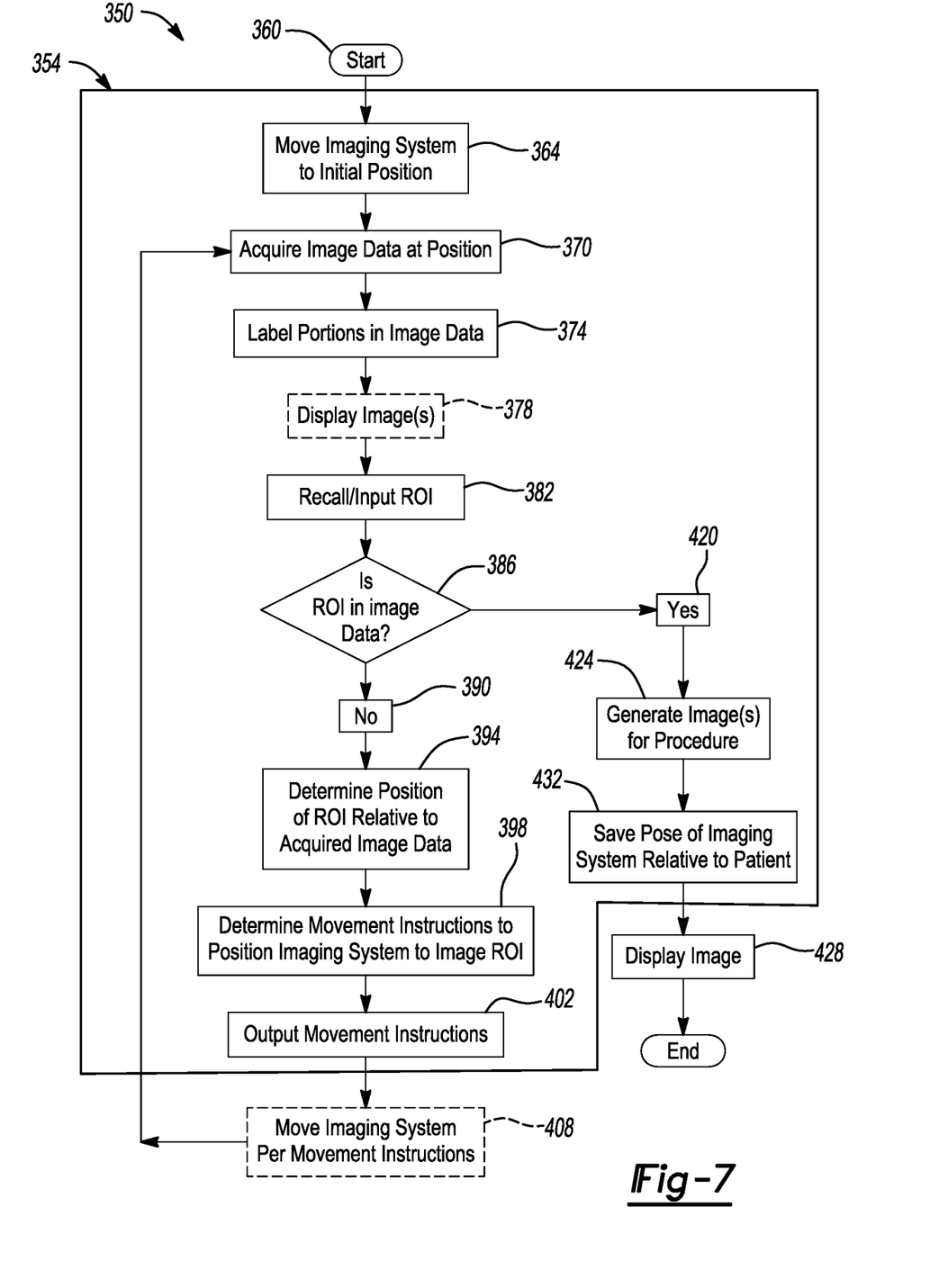
FIG. 7 is a flow chart of a method for determining and positioning an imaging system to image a region of interest of a subject.

With continuing reference to FIGS. 3 through 6 and additional reference to FIG. 7, a process or method 350 to generate image data of a selected portion of the patient 40, such as at the ROI T12 334 is disclosed. According to various embodiments, the ROI may be T12 334. Accordingly, the following disclosure referring to the ROI may also refer to the T12 vertebrae as it is the exemplary ROI. It is understood that any appropriate ROI may be identified and need not be the T12 334. For example, the ROI may be an alternative vertebra, such as L5. Additionally, the ROI may not be a vertebrae and may be or may also include a sternum of the patient 40. Additionally nonhuman portions may also be the ROI.

According to various embodiments, the process 350 may be carried out by a processor, as discussed above. The method 350 may include portions, such as at least a subprocess 354 that may be included in instructions that are executed by any appropriate processing unit, including those as discussed above. The method 350, however, may also include various portions that may be assisted manually, as discussed further herein.

The method 350 may begin and start at Block 360. Following the start Block 360, the imaging system may be moved to an initial position in Block 364. The initial position may be position 300, is illustrated in FIG. 3. The initial position may be a first position that is imaged with the imaging system 20. Therefore, the initial position 300 may be an initial position of the imaging system 20 and/or an initial position of the patient 40 being imaged relative to the imaging system 20. In various embodiments, as discussed above, the portion of the patient 40 being imaged may be one or more vertebrae of the spine 330.

The imaging system may be moved to the initial position in any appropriate manner, such as that discussed above. For example, the imaging system 20 may be moved within the handle 260 by the user 69. The imaging system 20 may also be substantially automatically moved, such as by operation of various mechanical portions of the imaging system 20 including driving the wheels 144-150 and/or moving the gantry 48 relative to the cart 100. As discussed above, the imaging system 20 may move substantially automatically based upon movement instructions to drive the wheels, the gantry 48, or other portions relative to the patient 40 and/or relative to the surface 280. Accordingly, instructions for amount of movement, speed of movement, and the like may be executed by the motion control 268 to move portions of the imaging system 20 relative to the patient 40.

Image data is acquired of the patient 40 at the selected position in Block 370. The image data may be collected at the initial position 300 or at subsequent positions (also referred to as poses of the imaging system 20), as discussed further herein. Accordingly, the acquisition of the image data may be of various portions of the patient 40, including the spine 330. As noted above, however, other portions may also be imaged and that the patient 40 may be a non-human patient, a non-living subject, or other item may also be imaged. Thus of the discussion and disclosure of the patient 40 as discussed herein is merely exemplary.

The image data may then be labeled in Block 374. Labeling of the image data in Block 374 may be carried out according to appropriate techniques. For example, a machine learning system, including a neural network, a deep neural network, or other appropriate machine learning or artificial intelligence systems may be trained to label various portions in the image data. Machine learning systems may include neural networks. In various embodiments a neural network may include a convolutional neural networks (CNN). Various convolutional no networks include U-net architecture, M-net, encoder-decoder, and/or neural network.

A machine learning system, including artificial intelligence systems such as those noted above, may be trained to identify and label portions in image data. For example, a training image data may be acquired of a plurality of patients. The neural network may be trained to identify specific vertebra within the image data. If a plurality of vertebrae are imaged, the trained artificial intelligence system may be able to identity and label one or more of the vertebra. Therefore, if a plurality of vertebrae are acquired in the image data, the trained system may identify each of those. As illustrated in FIG. 5, images may be generated and displayed, as exemplary or optionally noted in Block 378. The image 114a may include labels of the vertebrae that are included in the image 114a. The trained AI system may identify and label the specific vertebrae in the image. The image may be, optionally, displayed for viewing by the user 69, optionally. Therefore, the system may identify the specific vertebrae in the image data without displaying the image.

The region of interest or ROI may be recalled or input in Block 382. As illustrated in FIG. 5 the ROI may be T12 which is the thoracic vertebrae T12 334, is illustrated in FIG. 4. The input or recalled ROI may allow the system and/or the user 69 to identify if the ROI is within the image data that is acquired in Block 370. As illustrated in FIG. 5, T12 is not included in the image 114a. Thus, the acquired image data in Block 270 does not include the input or the recalled ROI. As the system, such as the imaging system and/or the navigation system has labeled the image data (illustrated at the image 114a) and has input or recalled the ROI, the system may determine if the ROI is within the image data.

A determination of whether the image data includes the ROI is made in Block 386. As illustrated in FIG. 5, the ROI is not in the acquired image data and thus a NO path 390 is followed. The determination Block 386 may also determine that the ROI is in the image data, as discussed further herein. Nevertheless, when the ROI is not in the acquired image data acquired in Block 370, the NO path 390 may be followed to determine a position of a ROI relative to be acquired image data in Block 394.

The determination or calculation of the position that the ROI is relative to the acquired image data is made in Block 394. The calculated position may be based upon various determinations, including a recalled position from a database (e.g., based on an atlas of anatomy of a human or other appropriate system), a machine learning system, or other appropriate systems. For example the ROI as the T12 may be predetermined or known to be within a selected distance of other vertebrae in the spine 330. As illustrated in FIG. 5, T10 is included in the image 114a. A predetermined average distance of 5 cm in a dorsal direction along a long axis of the patient 40 may be known and recalled from a database. Further, a calculation based upon a size of the vertebrae in the image data and/or other inputs may also be used to determine an amount and type of movement of the imaging system 20 to acquire image data including the ROI. Thus, the determination of the position of the ROI relative to the acquired image data from Block 370 may be made in Block 394 including an amount of movement (e.g., distance) and a type of movement (e.g., direction of movement) of the imaging system 20.

A determination of movement instructions to position the imaging system to image the ROI may then be made in Block 398. The movement instructions may include a speed of movement, type of movement, portion to be moved, and the like. In various embodiments, the instructions may include a final position. A motorized or moveable imaging system may receive the final location and determine how to operate moveable portions thereof to image the final position. Thus, the instructions may include specific movement directions and/or a final location. An exemplary movement of the imaging system may be determined to be 5 cm axially in a dorsal direction of the patient and may include only moving the gantry 48 relative to the cart 100. The movement may also include driving the wheels 144-150 to move the entire imaging system 20 at least a portion of the distance axially the 5 cm. The movement instructions may then be output in Block 402.

After outputting the movement instructions, a movement system may move the imaging system in Block 408. Movement of the imaging system in Block 408 is optional as a part of the method 350 and need not be included in the sub-process 354. Regardless, the imaging system 20 may be moved to the determined position of the ROI in Block 398 based upon the output movement instructions from Block 402. The movement of the imaging system may include movement to a subsequent or second position following the moving of the imaging system to the initial position at Block 364. Following the movement of the imaging system, image data may be acquired in a loop in Block 370. Thus, the sub-process 354 may be looped any appropriate number of times to ensure that the imaging system 20 is moved to image the ROI. The decision Block 386 allows a determination to be made of whether the image data includes the ROI. If it does not, then the NO path 390 may be followed any appropriate number of times to move the imaging system to the appropriate position. Once the ROI is in the image data, the determination Block 386 may then determine that the ROI is in the image data and a YES path 420 may be followed.

It is understood, however, that the YES path 420 may be followed immediately after a first image data is acquired. That is, one skilled in the art will understand, the image data after any acquisition may include the ROI. Thus, if the first image data includes the ROI, no additional image data may be necessary to generate an image including the ROI. Thus, after a first or initial image data acquisition in the YES path 420 may be followed.

In following the YES path 420, the imaging system need not be moved. That is the image data acquired with the imaging system 20 may be used to generate images for a procedure in Block 424. As discussed above, the images generated may be any appropriate image, such as two-dimensional images, three-dimensional images, or the like. Further they may include only the ROI and/or any appropriate portion.

Thus, as illustrated in FIG. 6, images generated with the image data may be displayed, such as in Block 428. The image 114b includes the ROI T12 334. Thus, any further determination of movement is not needed as the determination Block 386 has determined that the ROI is included in the image data.

Either after or at any appropriate time once the ROI is in the image data, it can be determined whether to save the pose of the imaging system in Block 432. As illustrated FIG. 6, an input may be received from the user to save a pose and/or automatically save the pose of the imaging system 20 that includes the ROI image data. The saving of the pose of the imaging system 20 when the ROI is included in the image data may allow the imaging system 20 to be returned to the same position at any appropriate time. The pose may be saved based upon a tracked position of the imaging system 20, relative to the patient such as the image tracker 72 relative to the patient tracker 70. Also, as noted above, the position of movement or type of movement of the imaging system 20 may also be saved and recalled before moving the imaging system back to the same position at a later time. In moving the imaging system back to the same position at a later time, which includes the ROI, a subsequent image may also be acquired. For example, following a procedure, the imaging system 20 may be used to acquire a confirmation image data of the patient 40 following the procedure. Thus, the tracked position of the imaging system 20 relative to the patient 40 with of the navigation system may be used to return that the imaging system 22 the same position relative to the patient 40 such confirmation image data acquisition.

Image data may then be displayed as images that are generated with the image data in Block 428. The displayed images may be used for assisting and navigating a procedure, such as tracking an instrument relative to the patient 40. As discussed above, the instrument tracker 74 may be tracked with the navigation system and the patient 40 may be tracked with the patient tracker 70. As the imaging system 20 may acquire image data of the patient 40 at a tracked position due to the image system tracker 72 and the patient tracker 70 the image data may be automatically registered to the patient 40. Thus, the tracked position of the instrument 74 may be registered relative to the image 114, including the image with the ROI 114b. A position of the instrument may then be displayed relative to the image 114 with a graphical representation 440. The graphical representation 440 may be any appropriate representation, such as a representation of the specific instruments or a generic an icon, such as a line illustrating a position of a tip of the instrument relative to the illustrated portion of the subject 40, such as the ROI. The representation 440 may be displayed relative to the image 114, such as superimposed thereon and/or relative thereto with a display device 64. Thus, the tracked position of the instrument may be displayed and known by the user 69.

Figure 8:
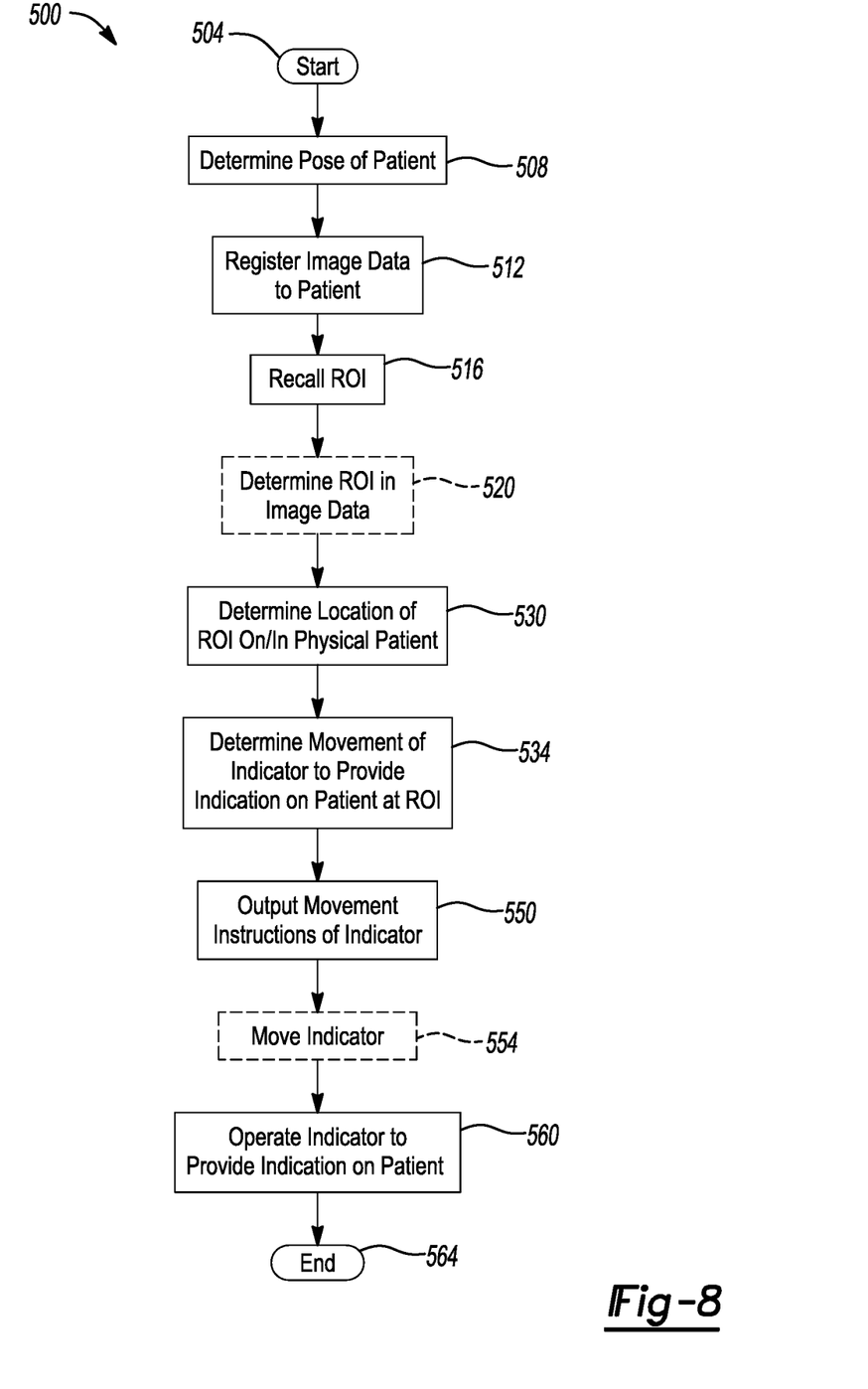
FIG. 8 is a flow chart of a method to provide an indication of a region of interest on the subject.

With continuing reference to FIGS. 1 through 7, and with additional reference to FIG. 8, a method of providing an indication on the patient 40 of the ROI is described. As discussed above, and as an example illustrated in FIG. 4 the indicator 320 may be associated with of the imaging system 20. It is understood, however, that the indicator 320 may also be provided separate from the imaging system 20. For example, an alternative or additional indicator 320' may be connected to a holder 450. The holder 450 may be a moveable arm to allow movement of the indicator 320' relative to the patient 40. The indicator 320' may be identical to the indicator 320 connected to the imaging system 20 or may be a different type of indicator. For example, the indicator 320' may be a physical pointer that has mechanical linkages to allow it to move or be moved, such as through motor control, relative to the patient 40. Thus, the indicator 320' may be moved relative to the vertebra 334 to provide a physical indication relative to the patient 40 of the ROI. As discussed further herein, therefore, it is understood that the indicator 320, 320' may be any appropriate type of indicator. Generally, however, the indicator 320, 320' may be operated to provide an indication that is viewable or understandable by the user 69 relative to the patient 40 of the ROI in or on the patient 40.

Illustrated in FIG. 8 is a flow chart 500 of a method that may be carried out by the user 69, one or more of the processing units, as discussed above, or as a combination thereof. Accordingly, the method 500 may be understood to be incorporated or can be incorporated into an algorithm that is executed by any appropriate processing unit, including those disclosed above, to move or operate the indicator 320, 320' to provide an indication on the patient 40. The process 500 may begin at start Block 504.

After starting the process 500, a determination of a pose of the patient 40 may be made in Block 508. A pose of the patient 40 may be determined with the navigation system 10, as discussed above. As noted above the patient tracker 70 may be tracked by the navigation system to allow for a determination of a pose of the subject 40. As discussed further herein, the imaging system 20 may also be tracked with the imaging system tracker 72 to allow for a registration of the image data to the patient, as included in Block 512. The registration of the image data to the patient Block 512 may occur according to any process, including those discussed above. Registration of the image data to the patient in Block 512 allows for a registration or co-localization of a location within the image data relative to the patient 40, such as in the patient 40. For example, the registration of the image data in Block 512 allows for an identification of the T12 vertebra 334 in the image data and in the image, as noted above, and this location or pose may be known in or on the patient 40 due to the registration as described above. Thus, registering the image data to the patient 40 may allow for an indication or knowledge of a pose (including a location) of the ROI within the image and within the patient 40. It is understood, however, that registering the image data to the patient Block 512 as a part of method 500 is optional and may otherwise be a separate therefrom.

The method 500 further includes recalling the ROI in Block 516. Recalling the ROI may occur at any appropriate time such as before or after determining a pose of the patient in Block 508 or registering image data to the patient 512. The recalling of the ROI in Block 516 allows for a determination of the ROI in the image data in Block 520. Determining the ROI in the image data in Block 520 is also optional in the method 500 and may be made at any appropriate time. As discussed above, the determination of the ROI in the image data may be made to during a determination of acquiring the image data of the patient 40 and, therefore, need not to be included in the method 500. A determination of the ROI location on or in the physical patient may be made in Block 530. Determining the location of the ROI in the physical patient is based upon the registration of the image data to the patient.

Once the determination of the location of ROI on or in the patient is made in Block 530, a determination of movement of the indicator to provide an indication on the patient at the ROI may be made in Block 534. The determination of movement of the indicator may be based upon the determined position or location of the ROI in the patient 40 and a current or initial position of the indicator relative to the determined location of the ROI on or in the patient 40. The indicator may be tracked or have a location or pose known relative to the patient 40 at a first or current time. For example, the imaging system 20 may be tracked relative to the patient 40 and the indicator 320 may be associated with the imaging system 20. Thus a pose of the indicator relative to the patient 40 may be known due to the known pose for the indicator relative to the imaging system 20, including the gantry 48. Determining a location of the ROI in the patient may be based upon the registration of the image data to the patient and the determination of the ROI in the image data. As discussed above, the ROI may be the T12 vertebra 334 and its determination in the image data may then be translated or determined in the physical space of the patient 40.

The indicator 320 may have a known or predetermined position relative to the imaging system 20 that is tracked relative to the patient 40 and therefore a pose of the ROI relative to the imaging system 20 may be determined, such as in Block 530, and a determined movement of the indicator to allow an indication on the patient 40 may be based thereon. For example, a determination that the indicator must project a laser beam at an angle 538 relative to a surface 540 of the gantry 48 may be determined such that the laser beam 340 is displayed or reaches the patient 40 at the ROI. Further, as noted above, the position or location of the indicator 320' may also be known at an initial position and a movement relative to the patient 40 may be determined based upon tracking the patient 40, tracking the indicator 320, and determining a type and amount of movement to move the indicator 320' to the portion of the patient 40 to indicate the ROI within the patient.

The movement of the indicator 320, 320' may be based upon instructions that allow for a substantially automatic movement of the indicators 320, 320'. The instructions may then be output in Block 550. Outputting the instructions in Block 550 may include outputting instructions to instruct movement of the indicator portion, a laser beam, or other appropriate indication that may be provided by the indicator 320, 320'. The movement instructions may include a type and speed of movement of motor, operating or moving a light beam, or other appropriate in movement instructions.

The indicator 320, 320' may then optionally be moved in the method 500 at Block 554. As discussed above, however, the instructions may be output and the movement of the indicator may be in addition to the method 500. The indicator may then be operated in Block 560 to provide an indication on the patient 40. Indication may include those discussed above and allow the user 69 to understand in the location or pose of the ROI within the patient 40 based upon the indication. For example, the indicator may include the laser beam that is projected onto a skin of the patient 40 exterior to the vertebrae including the T12 vertebra 334. The user 69 may then understand the location of the ROI within the patient 40 without performing exploratory surgery in the patient 40. Thus, the indicator may assist in performing an efficient procedure on the patient 40 by reducing or eliminating the need for various exploratory procedures.

The method that may end in Block 564. Ending the method in Block 564 may allow the user 69 to evaluate the indication provided by the method 500. The user 69 may provide input to adjust or perform the indication procedure 500 in addition to an initial or previous operation to assist in finalizing the provided indication. Nevertheless, the method 500 may end in Block 564 and allow the user 69 to perform a procedure on the subject 40.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit that may also be referred to as a processor. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors or processor modules, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "processor module" as used herein may refer to any of the foregoing structure or any other physical structure suitable for implementation of the described techniques. Also, the techniques could be fully implemented in one or more circuits or logic elements.

What is claimed is:

1. A method of imaging a selected portion-region of interest (ROI) of a subject with an imaging system, the method comprising:
    acquiring a first pose image data of the subject at a first pose of the imaging system relative to the subject;
    labeling a portion of the acquired first pose image data of the subject;
    determining whether the selected ROI of the subject is in the acquired first pose image data of the subject;
    determining a position of the selected ROI of the subject relative to the labeled portion of the first pose image data of the subject, if the selected ROI of the subject is not in the acquired first pose image data;
    determining a subsequent pose of the imaging system to acquire a subsequent pose image data of the selected ROI of the subject; and
    determining move instructions operable to be received by the imaging system to move the imaging system to acquire the subsequent pose image data of the selected ROI of the subject.

2. The method of claim 1, further comprising:
acquiring the subsequent pose image data at the subsequent pose of the imaging system relative to the subject;
labeling a subsequent portion of the acquired subsequent pose image data; and
determining whether the selected ROI of the subject is in the subsequent pose image data.

3. The method of claim 2, further comprising:
generating an image based on at least one of the subsequent pose image data or the first pose image data of the subject;
wherein the subsequent pose image data or the first pose image data is operable to include a plurality of image data.

4. The method of claim 2, further comprising:
saving at least one of the first pose of the imaging system or the subsequent pose of the imaging system.

5. The method of claim 4, further comprising:
recalling at least one of the saved first pose of the imaging system or the subsequent pose of the imaging system; and
following a procedure relative to the subject, determining move instructions to move the imaging system to at least one of the first pose of the imaging system or the subsequent pose of the imaging system.

6. The method of claim 1, wherein labeling the portion of the image data includes labeling at least one feature in the image data.

7. The method of claim 6, wherein labeling at least one feature in the image data includes identifying and labeling at least one vertebra of the subject as a specific vertebra of the subject.

8. The method of claim 6, wherein labeling the portion of the image data includes analyzing the image data with a trained neural network to label the portion of the image data.

9. A method of imaging a selected region of interest (ROI) of a subject with an imaging system, the method comprising:
acquiring a first pose image data of the subject at a first pose of the imaging system relative to the subject;
labeling a portion of the acquired first pose image data of the subject at least by executing instructions with a processor, wherein the instructions include a trained neural network;
determining whether the selected ROI of the subject is in the acquired first pose image data of the subject; and
generating an image based on the first pose image data if the selected ROI of the subject is determined to be within the acquired first pose image data of the subject.

10. The method of claim 9, further comprising:
determining a position of the selected ROI of the subject relative to the labeled portion of the first pose image data, if the selected ROI of the subject is not in the acquired first pose image data;
determining a subsequent pose of the imaging system to acquire a subsequent pose image data of the selected ROI of the subject; and
determining move instructions to move the imaging system to acquire the subsequent pose image data of the selected ROI of the subject.

11. The method of claim 10, further comprising:
acquiring the subsequent pose image data at the subsequent pose of the imaging system relative to the subject;
labeling a subsequent portion of the acquired subsequent pose image data; and
determining whether the selected ROI of the subject is in the subsequent pose image data.

12. The method of claim 11, further comprising:
generating the image based at least one of the subsequent pose image data or the first pose image data that is determined to include the selected ROI of the subject.

13. The method of claim 11, further comprising:
operating the imaging system to move based on the determined move instructions to move the imaging system.

14. A system to image a selected region of interest (ROI) of a subject with an imaging system, comprising:
an imaging system to acquire image data of the subject;
a processor configured to execute instruction to:
acquire a first pose image data of the subject at a first pose of the imaging system relative to the subject;
label a portion of the acquired first pose image data of the subject;
determine whether the selected ROI of the subject is in the acquired first pose image data of the subject;
determine a position of the selected ROI of the subject relative to the labeled portion of the first pose image data, if the selected ROI of the subject is not in the acquired first pose image data;
determine a subsequent pose of the imaging system to acquire a subsequent pose image data of the selected ROI of the subject; and
determine move instructions to move the imaging system to acquire the subsequent pose image data of the selected ROI of the subject.

15. The system of claim 14, wherein the processor comprises an imaging processor configured to execute the instructions to label the portion of the acquired first pose image data and a movement processor configured to execute the instructions to determine the move instructions to move the imaging system to acquire the subsequent pose image data of the selected ROI of the subject.

16. The system of claim 14, wherein the processor is configured to execute further instructions to:
acquire the subsequent pose image data at the subsequent pose of the imaging system relative to the subject;
label a subsequent portion of the acquired subsequent pose image data; and
determine whether the selected ROI of the subject is in the subsequent pose image data.

17. The system of claim 14, wherein the processor is configured to execute further instructions to:
generate an image based on at least one of the subsequent pose image data or the first pose image data.

18. The system of claim 14, wherein the processor is configured to execute further instructions to:
save at least one of the first pose of the imaging system or the subsequent pose of the imaging system.

19. The system of claim 18, wherein the processor is configured to execute further instructions to:
recall at least one of the saved first pose of the imaging system or the subsequent pose of the imaging system; and
following a procedure relative to the subject, determining move instructions to move the imaging system to at least one of the first pose of the imaging system or the subsequent pose of the imaging system.

20. The system of claim 14, wherein the processor is configured to execute further instructions to label the ROI of the subject of the image data by analyzing the image data with a trained neural network to label the ROI of the subject of the image data.

\* \* \* \* \*